United States Patent [19]
Raub et al.

[11] Patent Number: 4,834,795
[45] Date of Patent: May 30, 1989

[54] PINEAPPLE PEELER

[75] Inventors: John R. Raub, Oceanside; Roger J. Breton, Costa Mesa, both of Calif.

[73] Assignee: Juice Tree, Inc., Garden Grove, Calif.

[21] Appl. No.: 113,211

[22] Filed: Oct. 23, 1987

[51] Int. Cl.[4] .......................... A23N 4/00; A23N 7/00
[52] U.S. Cl. ...................................... 99/486; 99/542; 99/544; 99/589; 99/595
[58] Field of Search ................................. 99/537–545, 99/546, 547, 588, 589, 591, 593, 594, 595, 505, 485, 486; 426/482–484

[56] References Cited

U.S. PATENT DOCUMENTS

| | | | |
|---|---|---|---|
| 3,568,743 | 3/1971 | Dulieu . | |
| 3,656,527 | 4/1972 | Vadas et al. . | |
| 3,874,280 | 4/1975 | Vadas | 99/544 |
| 4,373,432 | 2/1983 | Tsutsumi | 99/542 |
| 4,497,245 | 2/1985 | Mori | 99/542 |

Primary Examiner—Timothy F. Simone
Attorney, Agent, or Firm—John J. Murphey

[57] ABSTRACT

A semiautomatic pineapple peeler in which adjustable width knife blades sever the ends of the pineapple and concentric cylindrical knives core and peel it, leaving the detached core in the peeled pineapple. The one step process is driven by two D.C. electric linear ball screw actuators, sequenced by an integrated circuit logic board and magnetic proximity limit switch arrangement. The peel is split in half by two radially mounted fins on the top and bottom of the large cylindrical knife, allowing the waste to be collected below.

The pineapple machine completely removes all of the peel and cores a single pineapple automatically, eliminating the two step manual operation of first cutting the ends off and then using the existing labor intensive lever operated coring and peeling devices.

27 Claims, 5 Drawing Sheets

PINEAPPLE PEELER

BACKGROUND OF THE INVENTION

In the past, pineapple peeling, on a commercial level, has been done exclusively on manual machines. Several types are in existence. Some do not core the pineapple and others reduce the labor required by rotating concentric cylindrical blades. All are level-actuated and require the ends of the pineapple to be previously removed.

SUMMARY OF THE INVENTION

The object of this invention is to provide a pineapple peeler that automatically cores and completely peels a single pineapple. The invention provides a safe means of peeling a pineapple completely by lifting a shield, inserting a pineapple, lowering the shield and pushing a start button. The machine does not need to be attended while operating.

DESCRIPTION OF THE PREFERRED EMBODIMENT

The preferred embodiment of this invention is shown in the figures to comprise a frame 1 constructed of long side rails 3 and a center rail 5 terminated at their respective ends by shorter cross rails 7 forming a generally flat, rigid mounting surface 9.

Figure 1:
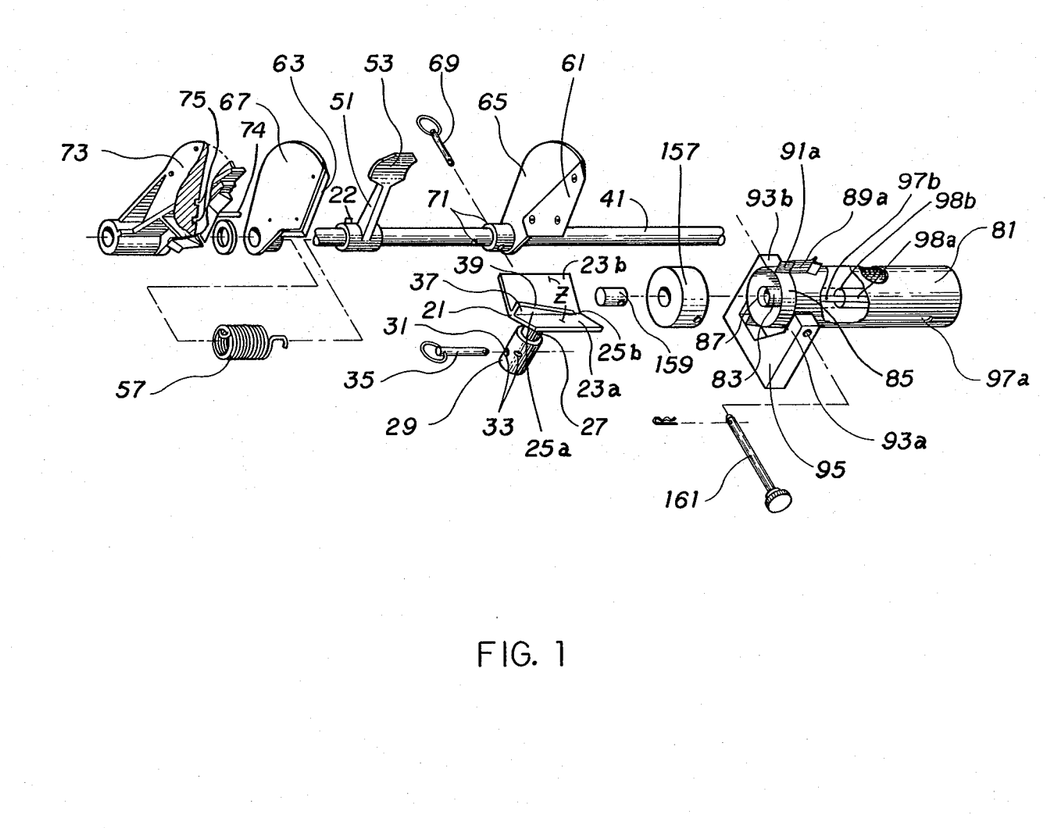
FIG. 1 is an exploded view of the knife blades, shaft assembly and adjustments.
Figure 2:
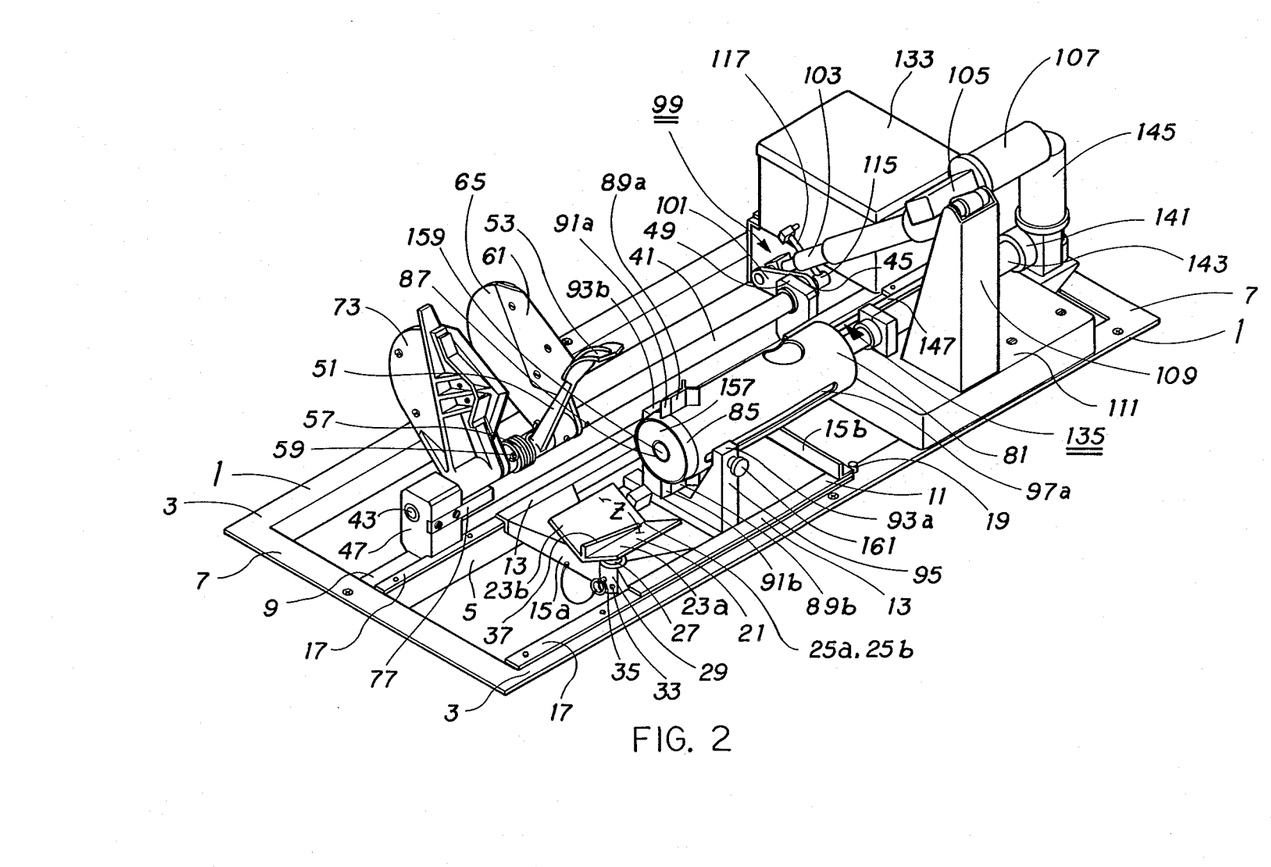
FIG. 2 is an isometric view of the assembly of parts.
Figure 3:
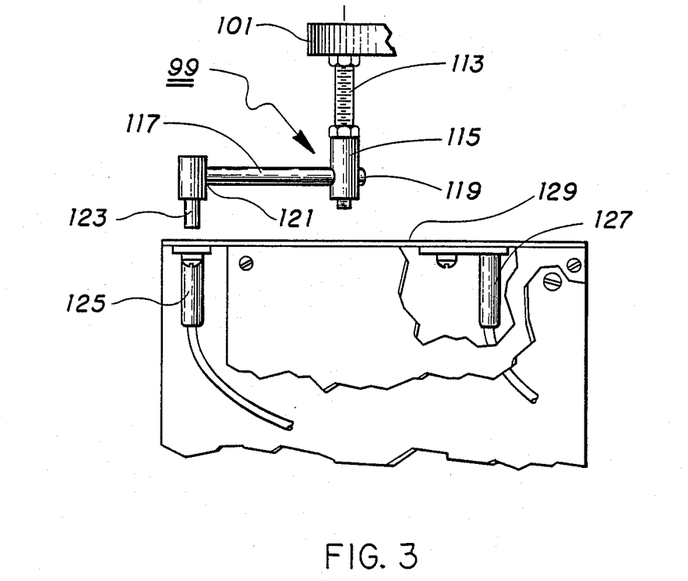
FIGS. 3 and 4 detail the limit switch arrangement, showing magnet and proximity switch locations.

A support slide 11 is mounted on frame 1 and comprises a pair of slide rails 13 held in spaced-apart relationship by cross-arms 15a and 15b, said slide positioned on frame 1 for rectilinear sliding motion therealong, on a pair of DELRIN (trademark) wear strips 17, from a first position, shown in FIG. 2, to a second position forward from what is shown, said support slide being restrained from moving behind said first position by a mechanical stop 19 affixed to frame 1 for contact with slide 11.

A pineapple support plate 21 is adjustably received on support slide 11 and comprises a pair of rectangular plates 23a and 23b in side-by-side arrangement, joined along their respective medial edges 25a and 25b with the planes of said plates forming an upwardly-facing obtuse angle "Z". A shank 27 depends from plate 21 and is received in a sleeve 29, formed in cross-arms 15a. A plurality of cross-bores 31 are formed in shank 27 for mating relationship with one or more pairs of cross-apertures 33 formed in sleeve 29 for matching therebetween in locking engagement with a pin 35 to adjust plate 21 for various diameters of pineapples.

Figure 6:
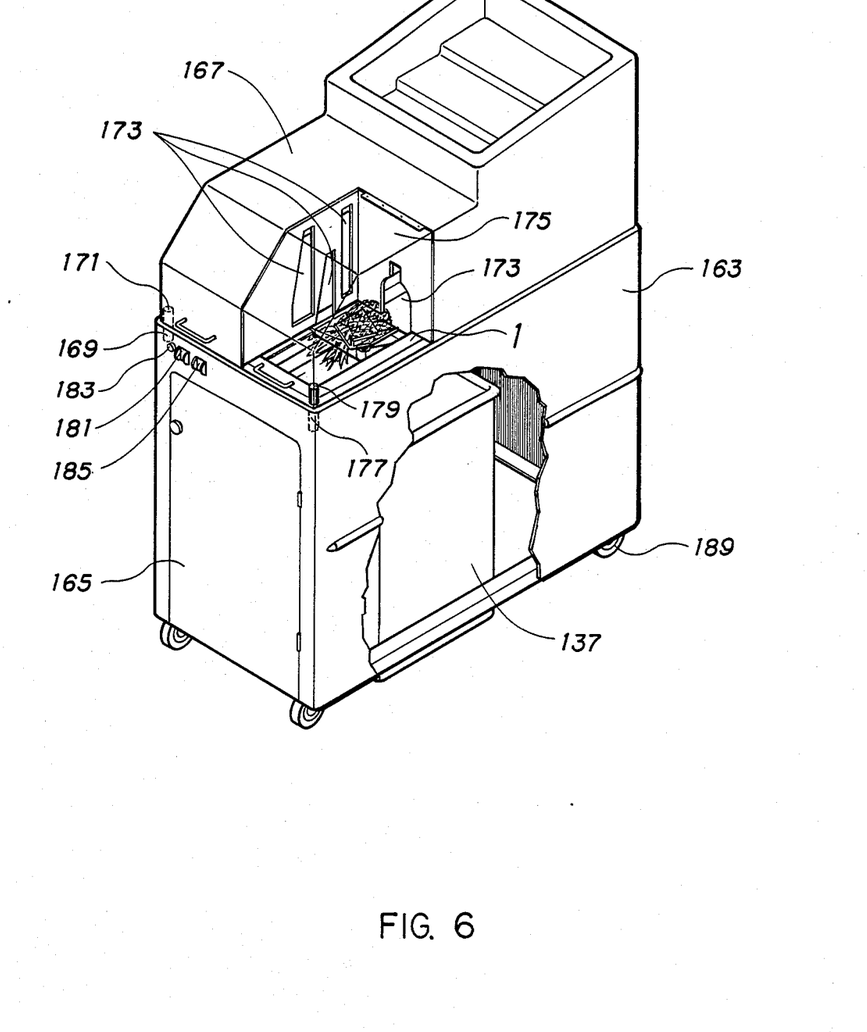

A pineapple leveling support tab 37 extends upwardly from the juncture of said medial edges 25a and 25b and contains an inclined edge 39 for supporting a pineapple in horizontal attitude on plate 21 as shown in phantom outline in FIG. 6.

A knife blade shaft 41 of terminal length is pivotally mounted on frame 1 having its terminal ends 43 and 45 supported in a pair of bearing blocks 47 and 49 preferably mounted on center rail 5.

A hold-down arm 51 is freely and pivotally mounted on knife blade shaft 41 and includes a clasping portion 53 for temporarily holding the pineapple on support plate 21 while in its first position. Arm 51 is restricted from rotational movement independent of knife blade shaft 41 toward support plate 21 by a set screw 22 threadably received in knife blade shaft 41 and extending outward therefrom into contact with arm 51. In addition, hold-down arm 51 is preloaded for restrained movement in the opposite direction, during rotation of knife blade shaft 41 and against the pineapple by a torsional spring 57 interconnected a pin 59 extending from knife blade shaft 41 and arm 51.

A pair of spaced-part pineapple end-cutting knives 61 and 63 are retained by known means, such as screws, in respective knife blade holders 65 and 67 that are in turn fixedly mounted on knife blade shaft 41, one on each side of hold-down arm 51 for advancing toward the pineapple, as it lay in horizontal position on support plate 21, to slice the top and bottom therefrom when support plate 21 is in its first position. Knife blade holder 65 is adjustably mounted to knife blade 41 through removable pin 69 received in mating cross-bores 71 to allow adjustment for different lengths of pineapples.

A backing plate 73 is freely and pivotally mounted on knife blade shaft 41 for rotational movement into a position spaced-apart and aligned with the topped-end of the pineapple after the top is cut away by knife blade 63. Backing plate 73 is restricted from movement beyond a position slightly to the rear of an upright position on shaft 41 by a dowel pin 74 that protrudes from backing plate 73 for contact against knife holder 67. It is further restricted from movement below an aligned, spaced-apart position adjacent the topped-end of the pineapple by contact with a stop bar 77 mounted on bearing block 47.

Backing plate 73 has circular grooves 75 formed therein coated with a hard-wearing material such as DELRIN (trademark) polymeric thermosetting acetyl resin as will be hereinafter more fully explained.

An outer cylindrical or tubular peeling knife 81 is mounted in coaxial relationship with an inner, smaller diameter coring knife 83, with their respective knife edges 85 and 87 lying in a common plane normal to mounting surface 9, and arranged for reciprocal action along the path of motion of support slide 11. A pair of pineapple peel-cutting knives 89a and 89b extend outward from the top and bottom respectively of outer tubular peeling knife 81 and have forwardly-facing knife edges 91a ad 91b.

Knives 81 and 83 are supported in horizontal relationship to frame 1 by a pair of spaced-apart support bushings 93a and 93b mounted on slide 11 by a bushing support plate 95 and received in a pair of slots 97a and 97b formed in the opposite sides of outer tubular peeling knife 81.

A first means 99 is provided for rotating clapsing-portion 53 of hold-down arm 51 into contact with the pineapple resting in horizontal attitude on support plate 21 and for moving end-cutting knives 61 and 63 into slicing contact with the pineapple and further moving backing plate 73 into position adjacent the topped-end of the pineapple and comprises a bell-crank 101 attached at one end to knife blade shaft end 45 and at the one end to a driver actuator arm 103 of a first linear ball-screw actuator 105 powered by a driver motor 107. Actuator driver motor 107 is pivotally mounted to a pedestal 109 attached to a nonmagnetic plate 111, attached to frame 1, such that actuator arm 103 depends at an angle of approximately 35° from the horizontal thereby holding bell-crank 101 normally at an angle of 10° below the horizontal.

Figure 5:
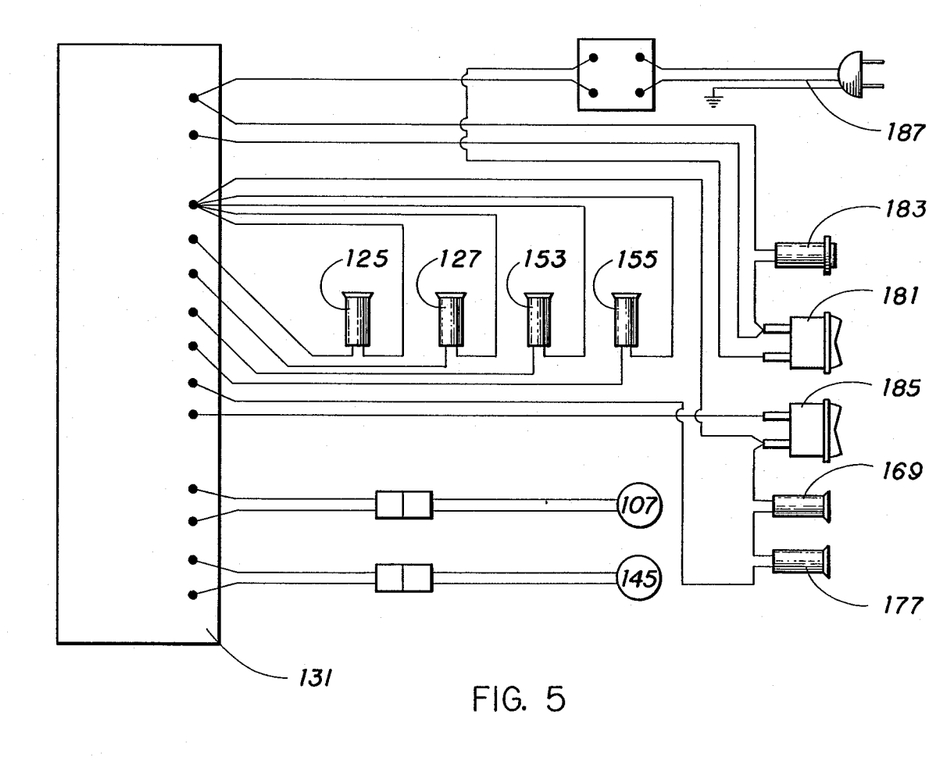
FIG. 5 is a schematic of the wiring as it is connected to the circuit board; and, FIG. 6 is an external view of the cabinetry and hardware.

In addition, first means 99 includes an extension rod 113 attached to knife blade shaft 41, outboard of bell-crank 101, a coupling 115 attached to rod 113 and a magnetic swing arm 117 attached at one end 119 to coupling 115. At the other end 121 of magnetic swing arm 117 is mounted a magnet 123. This entire assembly rotates with the angular position of knife blade shaft 41. A first pair of magnetic proximity switches 125 and 127 are mounted on the opposite side of a non-magnetic circuit board mounting plate 129 and interconnected a D.C.-powered logic board 131, containing an A.C.-D.C. rectifier, and associated switches and wires as shown in FIG. 5. Logic board 131 and the associated switches and wires are located in an electrical enclosure 133 as shown in FIG. 2.

A second means 135 is provided for causing support slide 11 to move from its first position, after a short span of lost motion, to its second position and thereafter return to said first position while advancing knives 81 and 83 and their respective edges 85 and 87 into symmetrical contact with the bottomed-end of the pineapple to pinch the pineapple between said knife edges and backing plate 73. Second means 135 also drives knives 85 and 87 through the pineapple into abutment with circular grooves 79 in backing plate 73 thereby cutting the peeling away from the outside of the pineapple and separating the core from the flesh of the pineapple.

Simultaneously, second means 135 advances pineapple support plate 21 toward backing plate 73 through contact with lower peel-cutting knife 89b so that support plate 21 ultimately moves into its second position, on the opposite side of the backing plate 73 as from whence it began its travel from its first position, and out from under the pineapple to allow the cut peeling to fall away from the pineapple. During this process, knife edges 91a and 91b slit the top and bottom respectively of the pineapple peeling to allow it to fall by gravity into a receptacle 137 set below.

Second means 135 further causes retraction of knives 81 and 83 from backing plate 73 for a measured distance and then continual retraction as well while simultaneously retracting support plate 21 from its second position, by contact between a tab 139 depending from outer knife 81 and cross-arm 15b of slide 11, beyond backing plate 73 to its first position under hold-down arm 51 to create a gap between the edges of knives 85 and 87 and support plate 21 as shown in FIG. 2.

Figure 4:
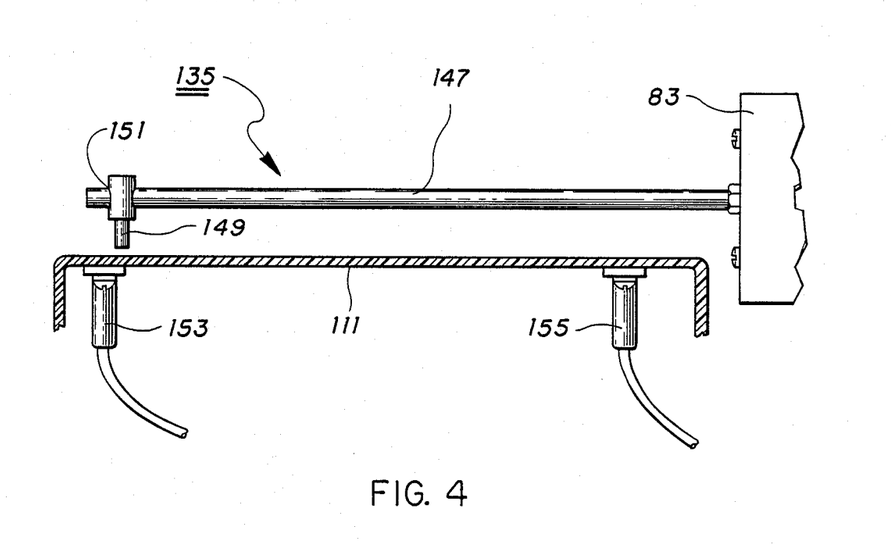

As shown in FIG. 4, second means 135 includes a second linear ball-screw actuator 141 comprising a driven actuator arm 143, attached to said coaxially joined knives 81 and 83, and a driver motor 145 connected to arm 143 and mounted to frame 1 through nonmagnetic plate 111. An extension rod 147 is attached to said peeling and coring knives 81 and 83 and extends rearwardly therefrom over plate 111 having a magnet 149 attached to its distal end 151. A second pair of magnetic proximity switches 153 and 155 are mounted under plate 111 at the ends of travel of knives 81 and 83 and are adapted to actuate driver motor 145 through logic board 131 in similar fashion as in the case of first means 99.

A flesh-removing plug 157 and a core-removing plug 159 are coaxially mounted in planar relationship on said support bushings 93a and 93b and held therein against movement by a pin 161 supported by knife support bushings 93a and 93b between knives 81 and 83 and passing through slots 97a and 97b and through a similar pair of slots 98a and 98b formed in the opposite sides of inner tubular coring knife 83. Upon retraction of knives 81 and 83 from the pineapple, plugs 157 and 159 contact the rearwardly traveling pineapple flesh and core and simultaneously urge them out from between knives 81 and 83 for capture between the edges of knives 85 and 87 and pineapple support plate 21.

Frame 1 is supported on an open cart 163 as shown in FIG. 6 and contains a door 165 therein for inserting and removing peelings receptacle 137. A top cabinet 167 is provided in hinged arrangement over frame 1 except for that area occupied by pineapple support plate 21 and hold-down arm 51. A magnetic proximity switch 169 is mounted under open cart 163 and a magnet 171 is provided in top cabinet 167 through a common interlock in logic board 131 to prevent operation of the machine while top cabinet 167 remains open.

A series of apertures 173 are formed in top cabinet 167 to allow hold-down arm 51, knives 61 and 63, backing plate 73 and peeling and coring knives 81 to 83 to engage the pineapple resting on support plate 21 during the operation of this machine. A clear shield 175 is hingedly mounted on cabinet top 167 for covering the pineapple, end-cutting knives 61 and 63, backing plate 73 and the advancing peeling and coring knives 81 and 83 during operation of the machine. A magnetic proximity switch 177 is provided in open cart 163 and a magnet 179 is operably positioned in clear shield 175 to permit logic board 131 to lock out operation of the machine while clear shield 175 is raised from its closed position down on top of frame 1.

A complete machine cycle cores and peels a single pineapple in the following manner: Adjustments are made to support plate 21 and end-cutting knife-holder 67 for the diameter and length to accommodate the run of pineapples to be peeled and cored. Clear shield 175 is raised and backing plate 73 is raised upward to a position inside top cabinet 167. A pineapple is placed horizontally on support plate 21 with the crown or bushy top facing away from coring and peeling knives 81 and 83. Shield 175 is closed completing the inner-lock circuit when door 165 is shut. The machine is provided with an "off/on" switch 181 and indicator light 183 and these are turned on.

An automatically resettable "start" switch 185 is provided that connects the incoming electrical power through line 187 to a 24 VAC transformer 189 and then to the respective D.C. reverse polarity actuator drive motors 107 and 145 through logic board 131. Logic board 131 first checks the conditions of knife blade shaft 41 via magnetic swing arm 117 and knives 81 and 83 via extension rod 147. If either or both magnets 123 and 149 are not positioned over the appropriate proximity switch, logic board 131 causes actuator motors 107 and 145 to drive the respective shaft and blades toward the "home" position until said proximity switches inform logic board 131 that the blades are retracted. Thence, knife blade shaft 41 is powered by first means 99 to cause end-cutting knives 61 and 63 to rotate downward severing the ends of the pineapple and driving backing plate 73 down into spaced-apart position adjacent the topped-end of the pineapple. The topped and bottomed cut-away portions of the pineapple fall by gravity down between rails 3 and 5 into receptacle 173. Once knives 61 and 63 have indicated completion through alignment of magnet 123 with proximity switch 125, logic board 131 causes first means 99 to rotate knife blade shaft 41 in the opposite directio to retract said blades and hold-down arm 51 through apertures 173 into top cabinet 167.

Thereafter, cylindrical knife blades 81 and 83 are advanced by second means 135 into symmetrical contact with the bottomed-end of the pineapple pinching it between said blades and backing plate 73. Simultaneously, bottom peel-cutting blade 89b pushes against pineapple support plate 21 and advances it out from under the pineapple and under backing plate 73 to its second position therebehind. Second means 135 forces said knives forward so that peeling knife 81 separates the peeling from the pineapple flesh while knives 89a and 89b slit the peeling lengthwise along the top and bottom of the pineapple to allow the pieces to fall by gravity through frame 1 into receptacle 137.

Simultaneously, coring knife 83 advances through the pineapple separating the core from the flesh. As knife blade edges 85 and 87 reach backing plate grooves 79, magnet 149 reaches forward proximity switch 163 signalling logic board 131 to begin reverse rotation of actuator 151 and retract knives 81 and 83 from the pineapple leaving the separated core inside the pineapple.

Tab 139 engages support slide cross-arm 15 on the rearward return of knives 81 and 83 causing slide 11 and pineapple support plate 21 to travel along the knives in bringing support plate 21 back to its first or original position. Simultaneously, flesh removing plug 157 and core removing plug 159 urge the pineapple flesh and core as a unit out from between knives 81 and 83 into a position between said knives and pineapple support plate 21. The peeled and cored pineapple is thereafter removed by raising clear shield 175, rotating backing plate 73 up through aperture 173 into an upright position on knife blade shaft 41 and removing the pineapple. Total cycle time is approximately 20 seconds.

The pineapple machine of this invention completely peels and cores a single pineapple automatically without any prior preparation. The invention requires very little human effort to operate and can cycle unattended after the pineapple has been loaded. The machine contains an overload feature to protect both machine and operator in case of misuse. Cleaning is accomplished easily by pouring water or disinfectant over the food-contact areas after use. The position of waste receptacle 137 underneath frame 1 permits collection of water therein to allow the machine to be cleaned anywhere. A set of wheels 189 positioned under cart 163 makes the machine portable.

What is claimed is:

1. A semi-automatic pineapple end-cutting, coring and peeling machine, comprising:
   (a) a frame constructed of long side rails terminated at their respective ends by shorter cross rails forming a generally flat, rigid mounting surface;
   (b) a support slide comprising a pair of rails, held in spaced-apart relationship by cross arms, mounted on said frame for reciprocal rectilinear sliding motion therealong from a first position to a second position and return;
   (c) a pineapple support plate attached to said support slide adapted to receive a pineapple in horizontal attitude when said slide is in said first position;
   (d) a hold-down arm pivotally mounted on said frame including a clasping portion for temporarily holding the pineapple on said support plate in said first position;
   (e) a pair of spaced-apart pineapple end-cutting knives pivotally mounted on said frame, one on each side of said hold-down arm for advancing toward the pineapple to slice the top and bottom therefrom while it is being held horizontally on said support plate in said first position;
   (f) a backing plate pivotally mounted on said frame for movement into spaced-apart position adjacent the topped-end of the pineapple;
   (g) an outer tubular peeling knife and an inner smaller diameter, tubular coring knife coaxially mounted for reciprocal motion along the path of motion of said support slide;
   (h) first means for moving said hold-down arm into contact with the pineapple resting in horizontal attitude on said support plate, moving said end-cutting knives into slicing contact with the pineapple and moving said backing plate into position adjacent the topped-end of the pineapple and return;
   (i) second means causing said slide to move from its said first position, after a short span of lost motion, to its said second position and thereafter return to its first position while:
      (1) advancing said knives into symmetrical contact with the bottomed-end of the pineapple and pinch the pineapple between said knife edges and said backing plate, driving said knives through the pineapple into contact with said end plate, thereby cutting the peeling away from the outside of the pineapple and separating the core from the flesh of the pineapple, and simultaneously advancing said support plate toward said backing plate and beyond to said second position out from under the pineapple to allow the cut peeling to fall away from the pineapple; and,
      (2) thereafter retracting said knives from said backing plate for a measured distance then continue retracting said knives and simultaneously retracting said support plate from its second position beyond said backing plate's lost motion travel to its first position under said hold-down arm to create a space between the edges of said knives and said support plate; and,
   (j) a flesh-removing plug and a core-removing plug coaxially mounted in planar relationship between said tubular knives and inside said coring knife, respectively, for urging the flesh and the separated core of the pineapple as a unit from between said knives, during retraction of said knives from said backing plate, to a position between said pineapple support plate and the edges of said knives for removal by placing one's hand under the pineapple flesh.

2. The semi-automatic pineapple end-cutting, coring and peeling machine of claim 1 wherein said frame includes a center rail spaced-apart and parallel to said long side rails.

3. The semi-automatic pineapple end-cutting, coring and peeling machine of claim 1 wherein said support slide is separated from said frame by wear strips.

4. The semi-automatic pineapple end-cutting, coring and peeling machine of claim 1 wherein said support slide is restrained from moving rearward of its said first position by a mechanical stop affixed to said slide.

5. The semi-automatic pineapple end-cutting, coring and peeling machine of claim 1 wherein said pineapple support plate comprises a pair of rectangular plates in side-by-side arrangement, joined along their medial edges with the planes of said plates forming an upwardly-facing obtuse angle.

6. The semi-automatic pineapple end-cutting, coring and peeling machine of claim 5 further including a pineapple leveling support tab extending upwardly from said juncture of said medial plate edges.

7. The semi-automatic pineapple end-cutting, coring and peeling machine of claim 1 wherein said pineapple support plate is adjustable on said slide to facilitate pineapples of varying diameters.

8. The semi-automatic pineapple end-cutting, coring and peeling machine of claim 5 further including a shank depending from said plates for receipt in a sleeve mounted on said slide, at least one cross-aperture formed through said sleeve, a plurality of cross-bores formed in said shank for matching with said cross-apertures and a cross-pin for locking receipt in said matched cross-aperture and cross-bore to hold said support plate in various positions to accommodate pineapples of different diameters.

9. The semi-automatic pineapple end-cutting, coring and peeling machine of claim 1 further including a knife blade shaft of terminal length pivotally received in a pair of bearing blocks mounted on said frame.

10. The semi-automatic pineapple end-cutting, coring and peeling machine of claim 9 wherein said hold-down arm is freely mounted on said knife blade shaft, restricted from rotational movement independent of said shaft toward said support plate by a set screw, extending outward from said shaft into contact with said arm, and preloaded for restrained motion in the opposite direction, along with rotation with said knife shaft, against the pineapple by spring means interconnected a pin extending from said shaft and said arm.

11. The semi-automatic pineapple end-cutting, coring and peeling machine of claim 9 wherein said pair of spaced-apart pineapple end-cutting knives are removably retained in a pair of knife blade holders, that are in turn held in rigid connection to said knife shaft through removable pins received in mating cross-bores formed in said shaft and said holders, to permit said blades and said holders to be removed and replaced.

12. The semi-automatic pineapple end-cutting, coring and peeling machine of claim 9 wherein said pair of spaced-apart pineapple end-cutting knives are rigidly mounted on said knife blade shaft and having their respective blades arranged for simultaneous cutting advance through the pineapple, while it is held by said hold-down arm on said support plate.

13. The semi-automatic pineapple end-cutting, coring and peeling machine of claim 12 wherein said cross-bores for said rear end-cutting knife are set at different locations on said knife blade shaft for adjustment of said knife shaft for pineapples of different lengths.

14. The semi-automatic pineapple end-cutting, coring and peeling machine of claim 1 wherein said backing plate is freely mounted on said knife blade shaft and restricted from movement to the rear of upright position by a dowel pin that protrudes from said backing plate for contact against said nearest knife blade holder and is restricted from movement below aligned spaced-apart position adjacent the topped-end of the pineapple by contact with a stop bar mounted on said front bearing block.

15. The semi-automatic pineapple end-cutting, coring and peeling machine of claim 14 wherein said backing plate has circular grooves formed therein for receiving the edges of said outer peeling knife and said inner coring knife after said knives pass through the pineapple.

16. The semi-automatic pineapple end-cutting, coring and peeling machine of claim 15 wherein said circular grooves are coated with DELRIN (trademark).

17. The semi-automatic pineapple end-cutting, coring and peeling machine of claim 1 wherein said first means comprises a first linear actuator including a actuator driver motor pivotally mounted to a pedestal attached to a nonmagnetic plate that is connected to said frame, an actuator arm driven by said driver motor attached thereto and connected to said knife blade shaft through a bell-crank for turning said shaft as a function of turning said drive-motor.

18. The semi-automatic pineapple end-cutting, coring and peeling machine of claim 17 wherein said actuator arm depends at an angle of approximately 35° below the horizontal and holding said bell-crank at an angle of about 10° below the horizontal to aid in turning said knife blade shaft.

19. The semi-automatic pineapple end-cutting, coring and peeling machine of claim 17 wherein said first means further includes an extension rod connected to said knife blade shaft, a coupling connected to said extension rod, a magnetic swing arm connected to said coupling and a magnet attached to said arm for swinging into magnetic field communication with a pair of magnetic proximity switches located adjacent thereto for limiting the rotational travel of said knife blade shaft.

20. The semi-automatic pineapple end-cutting, coring and peeling machine of claim 17 wherein said second means comprises a linear actuator including an actuator arm attached to said coaxially joined knives and an actuator motor connected to said arm and mounted to said frame through a nonmagnetic plate.

21. The semi-automatic pineapple end-cutting, coring and peeling machine of claim 20 further including an extension rod attached to said peeling and coring knives extending rearwardly therefrom over said nonmagnetic plate and having a magnet attached thereto for sliding into magnetic field communication with a pair of magnetic proximity switches located adjacent thereto for limiting the rectilinear travel of said knives.

22. The semi-automatic pineapple end-cutting, coring and peeling machine of claim 1 including a pair of spaced-apart peeling and coring knife support bushings received in a pair of slots formed in the opposite sides of said outer tubular peeling knife and retained in fixed position on said frame by a support block attached therebetween.

23. The semi-automatic pineapple end-cutting, coring and peeling machine of claim 22 further including a flesh-removing and a core-removing plugs are supported in planar relationship on said support bushings and held therein against movement by a pin supported by said knife support bushings and passing through said slots, formed in the opposite sides of said outer tubular peeling knife, and through a similar pair of slots formed in the opposite sides of said inner tubular coring knife.

24. The semi-automatic pineapple end-cutting, coring and peeling machine of claim 1 including a pair of pineapple peel cutting knives extending outward from the top and bottom, respectively, from said outer tubular peeling knife and having forwardly-facing knife edges to split the pineapple peel as it is being cut from the pineapple by said advancing outer tubular peeling knife and to have said bottom extending knife contact said pineapple support plate and move it out from under the pineapple under said backing plate.

25. The semi-automatic pineapple end-cutting, coring and peeling machine of claim 1 further including an incoming electric power transmission line and an integrated circuit logic board, for energizing said machine through a power switch and a "start" sequence switch through said cycle by said magnetic proximity switches to activate said first and said second means.

26. The semi-automatic pineapple end-cutting, coring and peeling machine of claim 1 further including an open cart on which said frame is mounted and for placement therein of a waste receptacle for receipt of pineapple peelings that fall from the pineapples, a top cabinet for covering all of said frame except said support plate and hold-down arm, said cabinet containing apertures for passing said end-cutting knives, said backing plate and outer peeling and inner coring knives into contact with the pineapple set on said support plate, a clear shield for covering the pineapple, end-cutting knives, backing plate and outer peeling and inner coring knives during operation of said machine and magnetic switches actuated by magnets located in said cabinet and said shield for insuring they are in the closed position upon initiation of operation of said machine.

27. A semi-automatic pineapple end-cutting, coring and peeling machine, comprising:
   (a) a frame constructed of long side rails terminated at their respective ends by shorter cross rails forming a generally flat, rigid mounting surface and including a center rail spaced-apart and parallel to said long side rails;
   (b) a support slide comprising:
      (1) a pair of rails, held in spaced-apart relationship by cross arms, mounted on said frame for reciprocal rectilinear sliding motion therealong from a first position to a second position and return;
      (2) wherein said support slide is separated from said frame by wear strips;
      (3) wherein said support slide is restrained fromm moving beyond its said first position by a mechanical stop affixed to said slide;
   (c) a pineapple support plate attached to said support slide adapted to receive a pineapple in horizontal attitude when said slide is in said first position, comprising:
      (1) a pair of rectangular plates in side-by-side arrangement, joined along their medial edges with the planes of said plates forming an upwardly-facing obtuse angle; and,
      (2) a pineapple leveling support tab extending upwardly from said juncture of said medial plate edges;
      (3) wherein said pineapple support plate is adjustable on said slide to facilitate pineapples of varying diameters;
   (d) a knife blade shaft of terminal length pivotally received in a pair of bearing blocks mounted on said frame;
   (e) a hold-down arm pivotally mounted on said frame including a clasping porton for temporarily holding the pineapple on said support plate in said first position wherein said hold-down arm is freely mounted on said knife blade shaft, restricted from rotational movement independent of said shaft toward said support plate by a set screw, extending outward from said shaft into contact with said arm, and preloaded for restrained motion in the opposite direction, along with rotation with said knife shaft, against the pineapple by spring means interconnected a pin extending from said shaft and said arm;
   (f) a pair of spaced-apart pineapple end-cutting knives mounted on said knife shaft, one on each side of said hold-down arm, for advancing toward the pineapple to slice the top and bottom therefrom while it is being held horizontally on said support plate in said first position and wherein said pair of knives are removably retained in a pair of knife holders, that are in turn held in rigid connection to said knife blade shaft through removable pins received in mating cross-bores formed in said shaft and said holders, to permit said blades and said holders to be removed and replaced and further wherein said cross-bores for said rear end-cutting knife are set at different locations on said knife blade shaft for adjustment on said shaft for different lengths of pineapples;
   (g) a backing plate freely mounted on said knife blade shaft for movement into spaced-apart position adjacent the topped-end of the pineapple, restricted from movement to the rear of an upright position on said knife blade shaft by a dowel pin protruding from said backing plate for contact against said knife blade holder and restricted from movement below aligned spaced-apart position adjacent the topped-end of the pineapple by contact with a stop bar mounted on said front bearing block and wherein said backing plate has circular grooves formed therein for receiving the edges of said outer peeling knife and said inner coring knife after said knives pass through the topped and bottomed pineapple and wherein said grooves are DELRIN (trademark) coated;
   (h) an outer tubular peeling knife and an inner smaller diameter, tubular coring knife coaxially mounted for reciprocal motion along the path of motion of said support slide;
   (i) a pair of spaced-apart knife support bushings received in a pair of slots formed in the opposite sides of said outer tubular peeling knife and retained in fixed position on said slide by a support block attached therebetween;
   (j) a pair of pineapple peel-cutting knives extending outward from the top and bottom, respectively, from said outer tubular peeling knife and having forwardly-facing knife edges to split the pineapple peel as it is being cut from the pineapple by said advancing outer tubular peeling knife and to have said bottom extending knife contact said pineapple support plate and advance it out from under the pineapple under and behind said backing plate;
   (k) first means for moving said hold-down arm into contact with the pineapple resting in horizontal attitude on said support plate, for moving said end-cutting knives into slicing contact with the pineapple and for moving said backing plate into position adjacent the topped-end of the pineapple comprising a first linear actuator including an actuator driver motor pivotally mounted to a pedestal attached to a nonmagnetic plate that is attached to said frame, an actuator arm driven by said driver motor attached thereto and connected to said knife blade shaft through a bell-crank for turning said shaft as a function of turning of said driver motor, wherein said actuator arm depends at an angle of approximately 35° below the horizontal thereby holding said bell-crank at an angle of 10° below the horizontal to aid in turning said knife blade shaft, and further including an extension rod connected to said knife blade shaft, a coupling connected to said extension rod, a magnetic swing arm connected to said coupling and a magnet attached to said arm for swinging into magnetic field communication with a pair of magnetic proximity switches located adjacent thereto for limiting the rotational travel of said knife shaft;

(l) second means causing said slide to move from its said first position, after a short span of lost motion, to its said second position and thereafter return to its first position:

(1) to advance said knives into symmetrical contact with the bottomed-end of the pineapple and pinch the pineapple between said knife edges and said backing plate, to drive said knives through the pineapple into contact with said end plate, thereby cutting the peeling away from the outside of the pineapple and separating the core from the flesh of the pineapple, and to simultaneously advance said support plate toward said backing plate and beyond to said second position out from under the pineapple to allow the cut peeling to fall away from the pineapple; and (2) to retract said knives from said backing plate for a measured distance then to continue to retract said knives and simultaneously retract said support plate from its second postion beyond said backing plate's lost motion travel to its first position under said hold-down arm to create a space between the edges of said knives and said support plate; and, comprising a linear actuator including an actuator arm attached to said coaxially joined knives and an actuator motor connected to said arm and mounted to said frame through a nonmagnetic plate;

(m) an electric power source and an integrated circuit logic board, to be energized initially by a power switch and a "start" sequence switch, and followed through said cycle by said magnetic proximity switches to activate said first and said second means; and, (n) an open cart on which said frame is mounted and for receipt therein of a waste receptacle for receipt of pineapple peelings that fall from the pineapples, a top cabinet for covering all of said frame except said support plate and hold-down arm, said cabinet containing apertures for passing said end-cutting knives, said backing plate and outer peeling and inner coring knives into contact with the pineapple set on said support plate, a clear shield for covering the pineapple, end-cutting knives, backing plate and outer peeling and inner coring knives during operation of said machine and magnetic switches actuated by magnets positioned in said cabinet and said shield for insuring they are in the closed position upon initiation of operation of said machine.

* * * * *